(12) United States Patent
Nussbaumer et al.

(10) Patent No.: US 9,615,598 B2
(45) Date of Patent: Apr. 11, 2017

(54) METHOD FOR PRODUCING MAIZE FLOUR

(71) Applicant: BÜHLER AG, Uzwil (CH)

(72) Inventors: Markus Nussbaumer, Kirchberg (CH); Noël Girardet, Heerbrugg (CH); Walter Wäspi, Ciudad Satélite (MX)

(73) Assignee: Bühler AG, Uzwil (CH)

( * ) Notice: Subject to any disclaimer, the term of this patent is extended or adjusted under 35 U.S.C. 154(b) by 0 days.

(21) Appl. No.: 14/680,161

(22) Filed: Apr. 7, 2015

(65) Prior Publication Data

US 2015/0208698 A1 Jul. 30, 2015

Related U.S. Application Data

(62) Division of application No. 13/825,069, filed as application No. PCT/EP2010/063803 on Sep. 20, 2010, now Pat. No. 9,113,651.

(51) Int. Cl.
*A23L 1/10* (2006.01)
*A23L 7/10* (2016.01)

(52) U.S. Cl.
CPC ............. *A23L 1/1041* (2013.01); *A23L 7/198* (2016.08); *A23V 2002/00* (2013.01)

(58) Field of Classification Search
USPC .................................................. 99/467–470
See application file for complete search history.

(56) References Cited

U.S. PATENT DOCUMENTS

| | | | |
|---|---|---|---|
| 3,194,664 A * | 7/1965 | Eytinge | B02B 1/04 426/626 |
| 3,278,311 A | 10/1966 | Brown et al. | |
| 3,369,908 A | 2/1968 | Gonzalez et al. | |
| 3,404,986 A | 10/1968 | Wimmer et al. | |
| 4,089,259 A | 5/1978 | Stickle et al. | |
| 4,250,802 A | 2/1981 | Rubio | |
| 4,312,892 A | 1/1982 | Rubio | |
| 4,463,022 A | 7/1984 | Sterner et al. | |
| 4,594,260 A | 6/1986 | Vaqueiro et al. | |
| 6,326,045 B1 | 12/2001 | Rubio et al. | |
| 6,872,417 B1 | 3/2005 | Freudenrich et al. | |
| 2006/0024407 A1 * | 2/2006 | Rubio | A21D 8/042 426/52 |
| 2006/0093713 A1 * | 5/2006 | Jurkovich | A23K 40/00 426/511 |

FOREIGN PATENT DOCUMENTS

| | | |
|---|---|---|
| WO | 02/056706 A1 | 7/2002 |
| WO | 03/063594 A2 | 8/2003 |
| WO | 2007/076356 A2 | 7/2007 |

OTHER PUBLICATIONS

Maizecor: Published Online at Least Feb. 2006; http://web.archive.org/web/20060209032428/http://www.maizecor.co.uk/process.asp.

* cited by examiner

*Primary Examiner* — Jianying Atkisson
(74) *Attorney, Agent, or Firm* — Davis & Bujold PLLC; Michael J. Bujold

(57) ABSTRACT

This invention provides a novel method for producing maize flour including at least one treatment step in which a product comprising maize is treated under alkaline conditions, wherein an alkaline solution is sprayed onto the product. Furthermore, a facility for producing maize flour is disclosed, in particular in said method. Moreover, maize flour obtained by this method and foodstuffs containing this flour are disclosed.

4 Claims, 1 Drawing Sheet

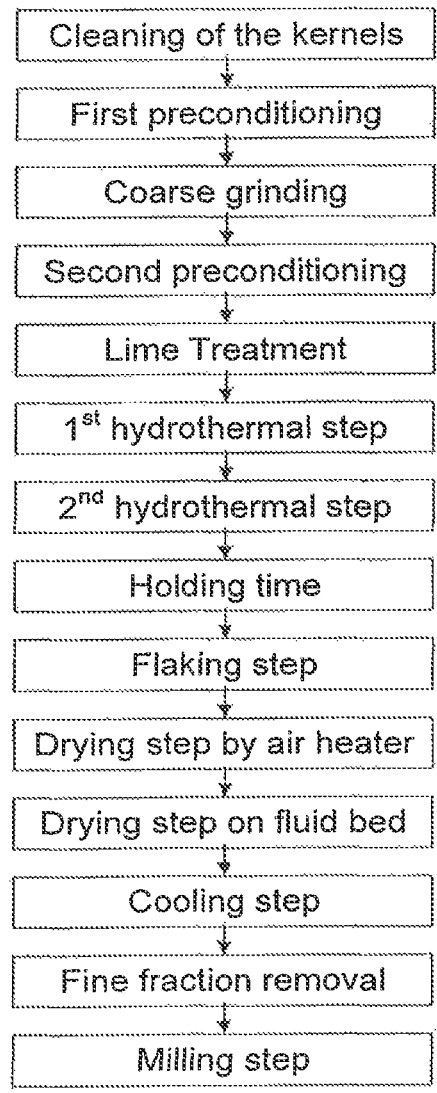

METHOD FOR PRODUCING MAIZE FLOUR

This application is a divisional of U.S. patent application Ser. No. 13/825,069 filed Mar. 13, 2013, which is a National Stage completion of PCT/EP2010/063803 filed Sep. 20, 2010.

Maize is a plant from the botanical family of the Poaceae and represents one of the most important cereal grains. The plant has its origin in Mexico. After the discovery of America by Christopher Columbus, maize was brought to Europe. In areas with high consumption of maize, a new disease—today known as Pellagra—has been observed. Pellagra is caused by a deficit of niacin. In countries where maize is a daily staff of life, the so-called nixtamalized corn is produced by the steps of alkaline cooking of corn (in particular in a lime solution), washing, wet milling the nixtamal, and drying, thereby producing corn maize flour in order to prohibit said deficiency symptoms. Flour produced by this method is usually called masa flour in the US and nixtalamizado in Mexico.

Besides the niacin release, the nixtamalization process comprises other positive effects. The most important biochemical changes during the nixtamalization process are:

increase in the calcium level with improvement in the Ca to P ratio;

swelling and gelatinization of starch;

decrease in insoluble dietary fiber and zein protein;

an improvement of the leucine to isoleucine ratio, reducing the requirement for niacin;

niacin-release from pericarp/aleuron/endosperm;

reduction or elimination of bacterial contamination.

Moreover, functional changes—especially by the addition of lime as alkali—can be observed as having beneficial influence on the taste, the viscosity and elasticity and the color of a tortilla dough prepared from the flour.

The main edible product produced from the nixtamalized corn flour is the tortilla, which is a flat, round, unfermented and baked, thin pancake.

Many conventional processes are described wherein the maize corn is cooked in an alkaline solution for many hours with the disadvantages of high energy demand for cooking and time- and energy-demanding wastewater treatment (e.g. in WO 03/063594 A2 and WO 02/056706 A1).

Several preparations of nixtamalized maize flour have therefore been developed by means of moist-heat cooking without wastewater production. In this production process, the raw materials water and alkali, in particular lime, and saturated steam as energy source are added in a precise and controllable dosage.

In WO 2007/076356 A2, such a preparation without occurring wastewater is disclosed for masa harina, whereby after one preconditioning step by spraying water, milling and sifting of the fine grind, said sifted fine grind has to be mixed with lime powder in order to receive a limed grind before moist-heat cooking.

U.S. Pat. No. 6,326,045 B1 also comprises a method for the production of corn flour by moist-heat cooking without wastewater. It is proposed to mix the flour finally with lime powder to obtain instant mesa flour.

U.S. Pat. No. 4,463,022 describes grain with added lime powder fed in a grinding chamber. Next to the downsizing of the grain, lime is distributed into the product by this process simultaneously.

When lime is added in powder form, it has to be homogeneously distributed on the surface of the corn by mechanical means as described in the prior art, which leads to an additional energy consumption. Moreover, the use of such mechanical means still does not ensure that the lime is distributed as homogeneously as necessary in order to prohibit any local concentration differences. Such local concentration differences lead to the fact that said important biochemical changes do not take place homogeneously or sufficiently in the whole product, having a negative influence on the quality of the maize flour, finally.

It is therefore an object of the present invention to avoid the disadvantages as described above. In particular, it is an object of the present invention to provide a method for producing maize flour which has a homogeneous lime distribution and which at the same time does not require additional waste water treatment and which is thereby cost and energy efficient.

Surprisingly, it has been found that spraying an alkaline solution, especially a lime solution, onto a product comprising maize solves this problem. This spraying step will subsequently be referred to as the treatment step. In particular, the lime is distributed homogeneously over the surface of the product, which minimizes local concentration differences without the need of an additional device for mixing the product with lime powder. Moreover, when solved in water, the alkali, in particular lime, can pass the surface into the corn to even improve the distribution in relation to the final product over the duration of this treatment step.

Prior to spraying the alkaline solution onto the product, the corn may be washed by any method, in particular by any conventional method.

Preferably, the alkaline solution, comprises water and between 1 and 5% by weight, more preferably between 2 and 4% by weight of lime.

The method may further comprise at least one preconditioning step preceding said treatment step, in which preconditioning step the product is moistened, in particular with water. Due to this preconditioning, the corn kernel is mellowed. The at least one preconditioning step, in particular each preconditioning step, may take between 2.5 and 12 hours, preferably between 3 and 10 hours. This time range guarantees that the corn kernel is mellowed sufficiently for a further optional milling step.

The method may comprise at least a first preconditioning step and a second preconditioning step, wherein the product is ground coarsely between the first preconditioning step and the second preconditioning step. This coarse milling increases the surface of the product and thereby facilitates the entry of water in the second preconditioning step. Preferably, during coarse grinding, the particles are ground to particle sizes in the range between 1000 μm and 6000 μm, more preferably between 1500 μm and 1500 μm.

The coarse grinding can be performed, for example, by a roller mill, in particular a four-roller mill.

After coarse grinding and preferably before the second preconditioning step, a fine fraction of the product may be removed by classifying, in particular by air-classification or sieving with a plan sifter ("Plansichter"). During this classification, particles having sizes below 1000 μm, preferably below 1500 μm can be removed from the product.

By the second preconditioning step, in which the received product is moistened with water, the water content in the hull and bran fraction can be further increased. When the time of the second preconditioning step is between 2.5 and 12 hours, preferably between 3 and 10 hours, a complete mellowing of the whole corn kernel is achieved, in particular to a water content of 20 to 30 wt %.

Subsequent to the second preconditioning step, the obtained product is subjected to the treatment step where it is sprayed with the alkaline solution, in particular the lime solution. Preferably, the alkaline solution is added to the product in an amount of 2 to 6%, preferably 3 to 5% by weight of dry matter of maize. Alkali or especially lime leads to diverse beneficial biochemical changes as described. The surface of the product is moistened with the solved alkali, in particular lime, with the advantages as described above, such as a homogeneous distribution of the lime within the flour.

The treatment step with alkaline, in particular lime solution, may be followed by a hydro-thermal treatment, in particular by steaming. This hydro-thermal treatment removes the diffusion barrier comprised by the hull fraction of the corn kernels allowing the alkali to soften and swell endosperm, germ and bran fractions. Moreover, this hydro-thermal treatment is necessary to intensity the biochemical changes by alkali, in particular lime as described, such as degradation of insoluble zein protein.

During the hydro-thermal treatment, the product may be heated to a temperature between 80 and 105° C., preferably between 95 and 100° C.

In some embodiments, the hydro-thermal treatment is performed in a two-stage process comprising at least a first hydro-thermal treatment step and a second hydro-thermal treatment step.

During the second hydro-thermal treatment step, the product undergoes biochemical changes such as protein degradation, especially a decrease of insoluble zein protein, which are intensified. Moreover, the second hydro-thermal treatment step also serves hygienic purposes by elimination of bacteria and/or pathogens.

At least part of the hydro-thermal treatment, in particular at least the second hydro-thermal treatment step, may be performed continuously. During hydro-thermal treatment by steaming, the product can be contacted directly with saturated steam at a temperature of 80-105° C., preferably at 95-100° C.; this may apply to any one or to both hydro-thermal treatment steps. Furthermore, during hydro-thermal treatment by steaming, the product may be contacted directly with saturated steam for 30-90 minutes (both hydro-thermal treatment steps taken together).

Preferably, the hydro-thermal treatment is followed by a holding time of at least 10 minutes, preferably at least 60 minutes, most preferably at least 90 minutes. This holding time, which can take place between steaming and an optional subsequent flaking step, serves for equalizing the temperature and moisture in the individual maize kernels, as well as improving the elasticity of the product, thereby facilitating downstream processing.

Furthermore, the method can comprise at least one flaking step in which the product is flaked. This flaking step can take place after the hydro-thermal treatment or holding time. By this flaking step, the product can be prepared for an optional subsequent drying step. In particular, a further bursting of the (insoluble) hull fraction by mechanical means can be obtained. Additionally, the surface of the received product can be increased by flaking, allowing optimized drying. Moreover, the starch structure is damaged, which proved advantageous in downstream processing.

The method may further comprise at least one drying step, in particular after the hydrothermal treatment or after the holding time or after the flaking step. By lowering the water content of the product in at least one drying step, the shelf-life of the final maize flour product can be prolonged. The water content is preferably reduced to lower than 12 wt %.

The product say be dried by hot-air or thermo-pneumatic drying. The hot air may be indirectly generated by an air-heater. The exhausted hot-air may be extracted.

At least, one drying step can be performed in a fluidized bed dryer or a roaster. By the cross-flow occurring in this dryer, hot air is contacted to the product more efficiently and the water content can be further decreased. Preferably, the method contains a first drying step performed in a hot-air drier and a second step performed in a fluidized bed drier or a roaster.

The method can further comprise at least one cooling step, in particular after the drying step. Cooling may be performed by cool-air drying of the product. This cooling step also results in a further reduction of the water content.

A subsequent milling step guarantees a uniform product specification at a certain degree of granulation. A hammer mill or a roller mill are suitable to perform this milling step in an accurate way.

A further aspect of the present invention is related to a facility for producing maize flour, in particular in a method as described above. This facility includes at least one preconditioner, preferably at least two consecutive preconditioners, for moistening a product comprising maize flour. At least one of the preconditioners may contain at least one spraying device for homogeneously spraying fluids onto the corn kernels.

Moreover, the facility comprises at least one further preconditioner for spraying an alkaline solution onto the product, in particular a lime solution. The further preconditioner also contains at least one spraying device. For the treatment step with alkali, this spraying device preferably comprises or consists of materials that resist, to a broad pH range, especially to alkaline conditions. Preferably, the surface walls of the facility which can get into contact with the product limed product also comprise or consist of such a material or materials. The preconditioner may also contain provisions for measuring and adjusting the temperature. The usage of three consecutive preconditioners allows a downstream process without any need for refeedings.

In addition, the facility comprises at least one steamer for steaming the product, in particular with saturated steam, and at least one dryer for drying the product, in particular at least one air-heater and/or at least one fluidized bed dryer and/or at least one roaster.

The facility may further comprise at least one of the following:
- at least one flaking device arranged between the at least one hydro-thermal device and the at least one dryer, for flaking the product;
- at least one cooling device arranged downstream of the dryer, for cooling the product;
- at least one classifying device, in particular downstream of the dryer or the cooling device, for removing a fraction comprising particles having sizes preferably below 1000 μm;
- at least one milling device, in particular downstream of the dryer or the cooling device or the classifying device, for milling the product, in particular a hammer mill or a roller mill.

These features allow the performance of the respective method steps as described above.

The invention is further related to a maize flour obtained by a method as described above and/or by a facility as described above. This maize flour has a better quality than those known from the prior art. It is highly desirable in the whole food industry that raw materials have measurably homogeneous and consistent product properties. The maize flour obtained by the present invention guarantees such a consistency for further processing such as the manufacture of tortilla. In particular, the viscosity, the elasticity and the color of a tortilla dough could be significantly improved when it was produced from the flour according to the present invention.

Referring now to FIG. 1, a preferred embodiment of the invention is illustrated by a flow diagram. First, corn kernels are cleaned by conventional methods. Subsequently, the product undergoes a first preconditioning step, in which the product, is moistened with water for about 12 hours. Afterwards, the corn kernels are ground coarsely, preferably by a four-roller-mill. During coarse grinding, the particles are ground to particle sizes in the range between 1000 and 6000 μm, more preferably between 1500 μm and 5500 μm.

After coarse grinding, a fine fraction of the product may be removed by classifying, in particular by air-classification or sieving, whereby particles below 1000 μm are removed, preferably below 1500 μm can be removed.

During a subsequent second preconditioning step taking about 12 hours, the water content, of the corn kernels is increased to 20-30 wt %. This first and second preconditioning may be performed in a Dampener Turbolizer MOZL or dampening screw NFAS obtainable from Bühler AG, Uzwil, Switzerland.

After said second preconditioning step, a lime solution is sprayed onto the product. The lime solution comprises water and between 2 and 4% by weight of lime. The lime solution is added to the product in an amount of 2 to 6%, preferably 3 to 5% by weight of dry matter of maize. This lime treatment may be performed by the POLYtherm™ BCTC preconditioner, obtainable from Bühler AG, Uzwil, Switzerland.

Afterwards, a steaming step is performed in a two-stage process. In the first steaming step, which may also be performed by the above-mentioned POLYtherm™ BCTC, the product is heated to a temperature between 80 and 105° C. The second, continuous steaming step may be performed by an MBDA steamer, also obtainable from Bühler AG, Uzwil, Switzerland. In the second steaming step, the product is contacted directly with saturated steam at a temperature of 95-100° C. The ratio in the second steaming step is 70 to 80% by weight of dry matter of the product to 20 to 30% by weight water. The water content of the product thereafter is 20 to 30% by weight.

The holding time after the two steaming steps takes most preferably about 90 minutes.

Next, a flaking step is performed by a flaking roller mill. This flaking step may be performed by a POLYfloc™ ECFA Flaking Roller Mill, also obtainable from Bühler AG, Uzwil, Switzerland. Then, a first drying step is performed by hot air indirectly generated by an air-heater. A second drying step is conducted, by a fluidized bed drier, preferably an OTW-Z obtainable from Bühler AG, Uzwil, Switzerland. After the drying steps, the product has preferably a water content of lower than 12 wt %.

Subsequently, cooling may be performed by cool-air drying of the product. A fine fraction can be removed in a classifying step. Preferably, a fraction comprising particles having sizes below 1000 μm can be removed. A milling step guarantees a uniform product specification at a certain degree of granulation. A hammer mill or a roller mill is suitable to perform this milling step in an accurate way.

The invention claimed is:

1. A facility configured to process a maize corn product comprising maize to produce maize flour, the facility comprising in consecutive order in a main stream of processing:
   at least one preconditioner configured to moisten the maize corn product to produce a preconditioned maize corn product,
   at least one further preconditioner comprising at least one spraying device configured to spray an alkaline solution onto the preconditioned maize corn product to produce a treated and preconditioned maize corn product,
   at least one steamer configured to steam the treated and preconditioned maize corn product,
   wherein the treated and preconditioned maize corn product is directly contacted with steam at a temperature of 80-105° C. in order to produce a steamed, treated and preconditioned maize corn product,
   at least one dryer configured to dry the steamed, treated and preconditioned maize corn product, after the steamed, treated and preconditioned maize corn product has been held for a holding time of at least 10 minutes after steaming thereof, in order to produce a dried, held, steamed, treated and preconditioned maize corn product, and
   at least one milling device, for milling the dried, held, steamed, treated and preconditioned maize corn product to produce the maize flour.

2. The facility according to claim 1, further comprising at least one flaking device arranged between the at least one steamer and the at least one dryer, and configured to flake the steamed, treated and preconditioned maize corn product.

3. The facility according to claim 1, further comprising at least one cooling device arranged downstream of the dryer, for cooling the dried, held, steamed, treated and preconditioned maize corn product.

4. The facility according to claim 1, further comprising at least one classifying device, configured to remove a fraction comprising particles having sizes below 1,000 μm from the main stream of processing prior to the spraying in the at least one further preconditioner.

* * * * *